US009428024B2

(12) United States Patent
Park

(10) Patent No.: US 9,428,024 B2
(45) Date of Patent: Aug. 30, 2016

(54) BUMP SHOCK ABSORBING DEVICE

(71) Applicant: HYUNDAI MOBIS CO., LTD., Seoul (KR)

(72) Inventor: Jong Woo Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/593,511

(22) Filed: Jan. 9, 2015

(65) Prior Publication Data
US 2015/0197131 A1 Jul. 16, 2015

(30) Foreign Application Priority Data

Jan. 15, 2014 (KR) .................. 10-2014-0005127

(51) Int. Cl.
| *F16F 15/03* | (2006.01) |
| *B60G 15/04* | (2006.01) |
| *B60G 17/015* | (2006.01) |
| *B60G 17/06* | (2006.01) |
| *B60G 13/02* | (2006.01) |

(52) U.S. Cl.
CPC ............... *B60G 15/04* (2013.01); *B60G 13/02* (2013.01); *B60G 17/0157* (2013.01); *B60G 17/06* (2013.01); *B60G 2202/20* (2013.01); *B60G 2204/45* (2013.01); *B60G 2204/4502* (2013.01); *F16F 15/035* (2013.01)

(58) Field of Classification Search
CPC B60G 15/04; B60G 15/067; B60G 17/0157; B60G 17/016; B60G 2204/4502; B60G 2204/45; B60G 2600/26; F16F 15/03; F16F 15/035
USPC ......... 267/139, 140, 140.11, 140.14, 140.15, 267/140.4, 153, 195, 220, 233, 292; 188/267
See application file for complete search history.

(56) References Cited

U.S. PATENT DOCUMENTS

| 3,770,290 | A | * | 11/1973 | Bottalico | ............... | B60G 13/14 188/164 |
| 4,432,441 | A | * | 2/1984 | Kurokawa | .............. | F16F 6/005 188/267 |
| 4,624,435 | A | * | 11/1986 | Freudenberg | ........... | F16F 15/03 180/300 |
| 5,236,186 | A | * | 8/1993 | Weltin | .................... | F16F 7/108 188/267 |
| 5,301,111 | A | * | 4/1994 | Utsui | .................. | B60G 17/0157 280/5.507 |
| 6,032,770 | A | * | 3/2000 | Alcone | .................. | F16F 7/1011 188/378 |
| 6,327,024 | B1 | * | 12/2001 | Hayashi | .................. | F16F 15/02 188/267 |
| 7,918,431 | B2 | * | 4/2011 | Ham | ...................... | F16F 6/005 188/267 |
| 8,276,894 | B2 | * | 10/2012 | Dickson | .................. | F16F 1/373 267/116 |
| 2007/0273074 | A1 | * | 11/2007 | Mizuno | .............. | B60G 17/0157 267/140.15 |

(Continued)

FOREIGN PATENT DOCUMENTS

KR 10-2009-0081483 A 7/2009

*Primary Examiner* — Thomas Irvin
(74) *Attorney, Agent, or Firm* — Knobbe Martens Olson & Bear LLP

(57) ABSTRACT

A bump shock absorbing device may include: a stopper member provided on a vehicle body and contacted and compressed against a chassis according to a bump of the vehicle body; and a magnetic force generation member including a pair of magnetic force generation members provided to face the chassis and the vehicle body, respectively, and generating a magnetic force to absorb shock caused by the bump of the vehicle body.

9 Claims, 6 Drawing Sheets

(56) References Cited

U.S. PATENT DOCUMENTS

| | | | | |
|---|---|---|---|---|
| 2009/0236192 A1* | 9/2009 | Takeuchi | ............... | B60G 13/02 188/267 |
| 2012/0267204 A1* | 10/2012 | Takeuchi | ............... | B60G 13/02 188/267 |
| 2013/0161885 A1* | 6/2013 | Marienfeld | ........... | F16F 13/266 267/140.14 |
| 2015/0231942 A1* | 8/2015 | Trangbaek | ............... | F16F 15/03 267/195 |
| 2015/0260252 A1* | 9/2015 | Smith | ..................... | F16F 15/03 188/267 |

\* cited by examiner

BUMP SHOCK ABSORBING DEVICE

CROSS-REFERENCES TO RELATED APPLICATIONS

The present application claims priority to Korean application number 10-2014-0005127, filed on Jan. 15, 2014, which is incorporated by reference in its entirety.

BACKGROUND

The present disclosure relates to a bump shock absorbing device, and more particularly, to a bump shock absorbing device which absorbs shock using a magnetic force, when a bump of a vehicle is formed.

In general, a bump of a vehicle body is formed by a shock from the road, braking, acceleration or the like, during operation of a vehicle. In order to maintain a ride quality and to prevent damage of parts when the bump of the vehicle is formed, a suspension, a stopper member and the like are mounted in the vehicle.

The stopper member is interposed between a chassis and a vehicle body, and prevents the chassis and the vehicle body from directly colliding with each other.

The related art of the present invention is disclosed in Korean Patent Laid-open Publication No. 10-2009-0081483 published on Jul. 29, 2009, and entitled "Bump stroke adjusting device of vehicle".

In general, a stopper member applied to a vehicle is formed of an elastic material to restrict a bump. When a bump of a vehicle body is formed by strong shock or the like, shock may not be sufficiently absorbed. In this case, a ride quality may be degraded, and parts may be damaged.

Thus, there is a demand for a structure capable of solving the problem.

SUMMARY

Embodiments of the present invention are directed to a bump absorbing device capable of absorbing shock when a bump of a vehicle is formed.

In one embodiment, a bump shock absorbing device may include: a stopper member provided on a vehicle body and contacted and compressed against a chassis according to a bump of the vehicle body; and a magnetic force generation member including a pair of magnetic force generation members provided to face the chassis and the vehicle body, respectively, and generating a magnetic force to absorb shock caused by the bump of the vehicle body.

The stopper member may include: an upper seat part coupled to the vehicle body; and a stopper part coupled to the upper seat part and contacted and elastically compressed against the chassis according to the bump of the vehicle body.

The pair of magnetic force generation members may be positioned at the top and bottom of the stopper member.

The pair of magnetic force generation members may include: an upper magnetic force generation member coupled to the vehicle body so as to generate a magnetic force; and a lower magnetic force generation member coupled to the chassis, and provided at a position corresponding to the upper magnetic force generation member so as to generate a magnetic force. The upper and lower magnetic force generation members may be provided in such a manner that the same polarities thereof face each other.

Each of the magnetic force generation members may include: a magnetic force generation part generating a magnetic force; and a fixation member coupling the magnetic force generation part to the top or bottom of the stopper member.

The magnetic force generation part may include an electromagnet.

The fixation member may include: a holder part formed to surround the magnetic force generation part and including a non-conductor; and a fixation bracket part fixing the holder part to the top or bottom of the stopper member.

The holder part may include: a holder body having a space formed therein, into which the magnetic force generation part is inserted; and a holder cap detachably coupled to the holder body and preventing the magnetic force generation part from coming off the holder body.

The holder body and the holder cap may be screwed to each other.

The stopper member and the magnetic force generation member may have an entry and exit hole formed therethrough.

The bump shock absorbing device may further include: a sensor unit configured to measure a bump value indicating to which extent the bump of the vehicle body is formed; a magnetic force adjusting unit configured to adjust a magnetic force of the magnetic force generation member; and a control unit configured to control the magnetic force adjusting unit to adjust the magnetic force generated from the magnetic force generation part according to the bump value.

The sensor unit may include a height sensor which is mounted on a suspension or the vehicle body so as to measure a rotation angle or height of the vehicle body.

The magnetic force adjusting unit may include a power supply unit for adjusting power supplied to the magnetic force generation part.

The magnetic force adjusting unit may adjust the magnitude and direction of a current transmitted to the magnetic force generation member from a battery, and adjust a magnetic force generated from the magnetic force generation member.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
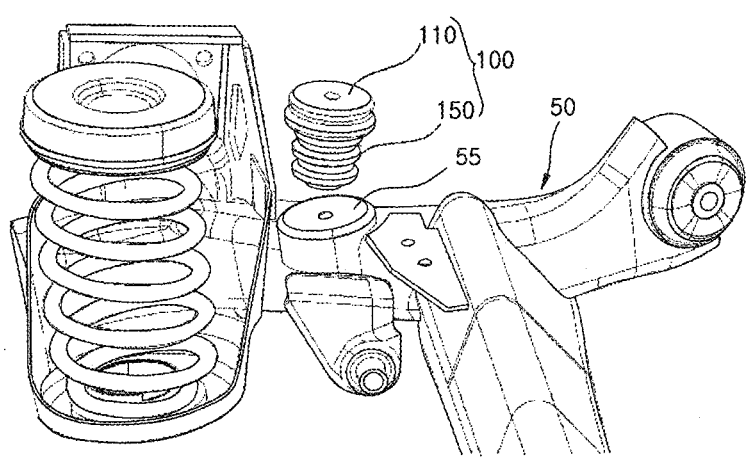
FIG. 1 is a diagram illustrating a state in which a bump shock absorbing device in accordance with an embodiment of the present invention is mounted.
Figure 2:
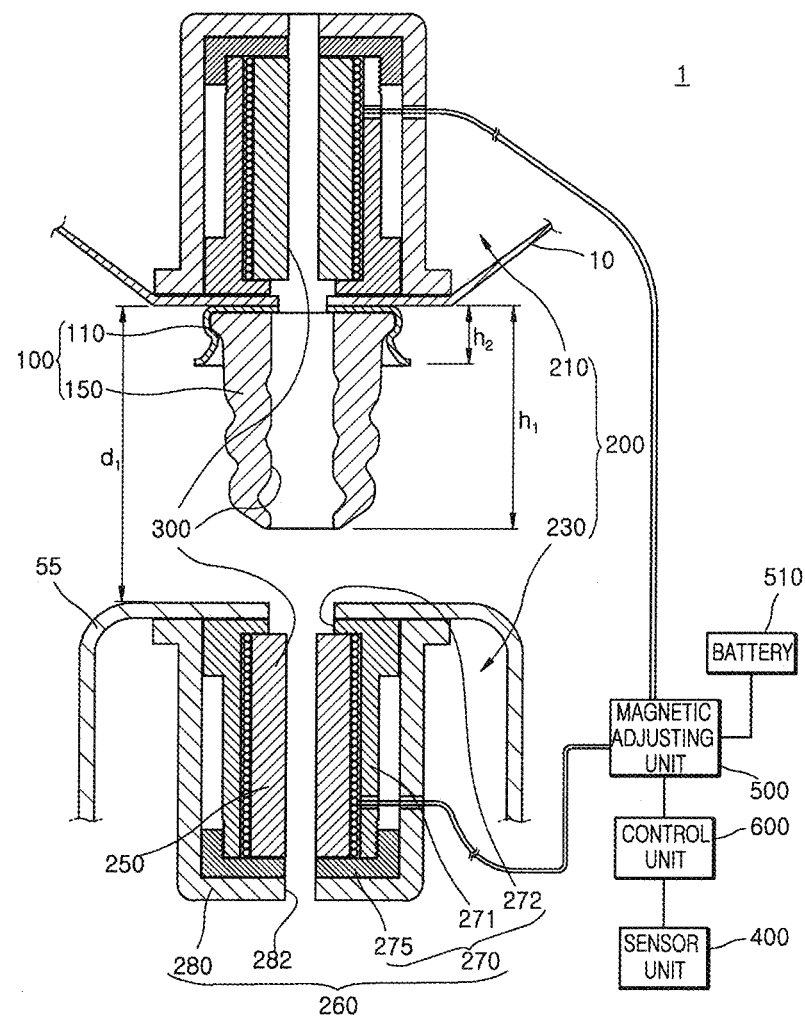
FIG. 2 is a cross-sectional view of the bump shock absorbing device in accordance with the embodiment of the present invention.

FIG. 1 is a diagram illustrating a state in which a bump shock absorbing device in accordance with an embodiment of the present invention is mounted. FIG. 2 is a cross-sectional view of the bump shock absorbing device in accordance with the embodiment of the present invention.

Referring to FIGS. 1 and 2, the bump shock absorbing device 1 in accordance with the embodiment of the present invention may include a stopper member 100 and a magnetic force generation member 200.

The stopper member 100 may be interposed between a vehicle body 10 and a chassis 50, and contacted with a stopper bracket 55 when a bump of the vehicle body 10 is formed. The stopper member 100 may be elastically compressed between the vehicle body 10 and the chassis 50, and prevent the vehicle body 10 and the chassis 50 from directly colliding with each other. In the present embodiment, the stopper member 100 may include an upper seat part 110 and a stopper part 150.

The upper seat part 110 may be formed of a metallic material, and coupled to the vehicle body 10 through welding or bolting. In the present embodiment, the upper seat part 110 may be formed in a cap shape of which the bottom is opened, and the stopper part 150 may be inserted into the upper seat part 110.

The stopper member 150 may be pressed into the upper seat part 110, and contacted and compressed against the stopper bracket 55 provided on the chassis 50, depending on the bump of the vehicle body 10. In the present embodiment, the stopper part 150 may be formed of a urethane material and formed as an integral part.

Figure 3:
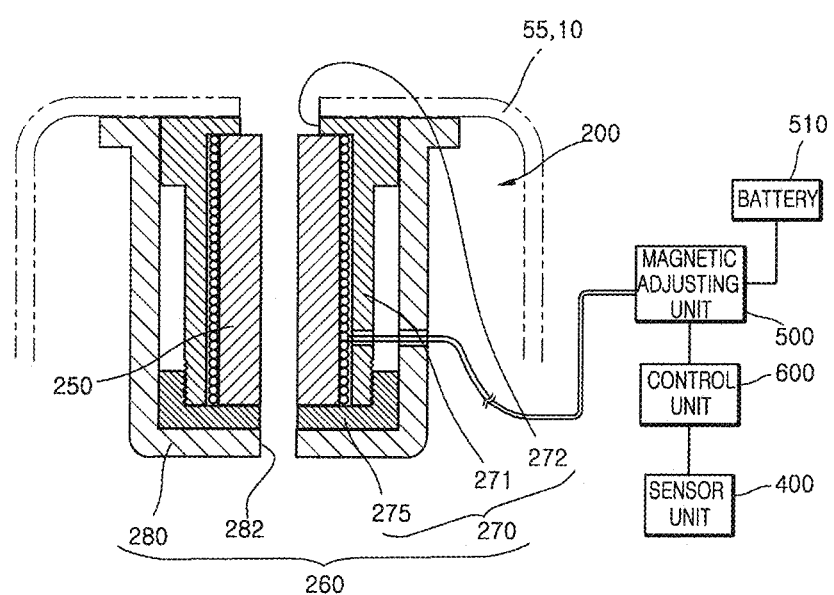
FIG. 3 is a cross-sectional view of a magnetic force generation member in accordance with the embodiment of the present invention.
Figure 4:
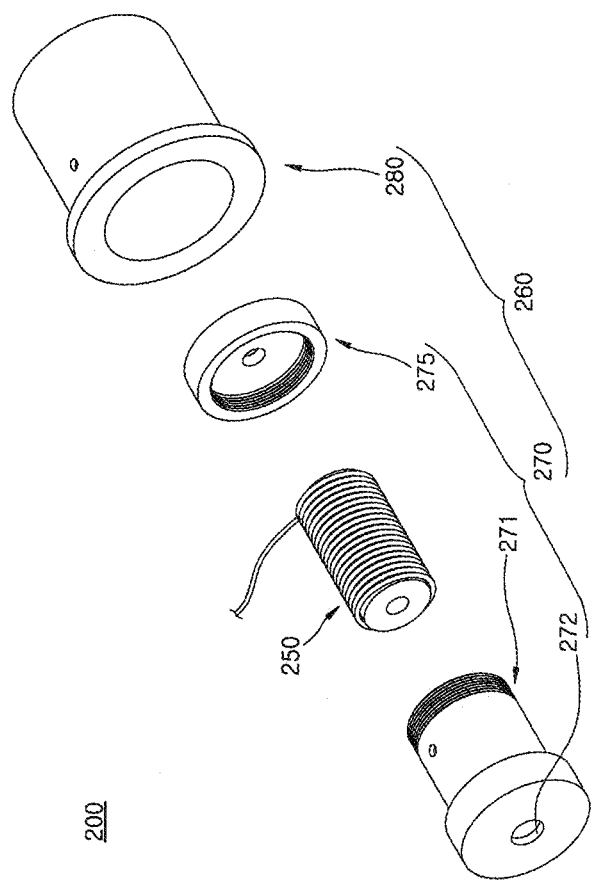
FIG. 4 is a diagram illustrating the structure of the magnetic force generation member in accordance with the embodiment of the present invention.

FIG. 3 is a cross-sectional view of the magnetic force generation member in accordance with the embodiment of the present invention. FIG. 4 is a diagram illustrating the structure of the magnetic force generation member in accordance with the embodiment of the present invention.

Referring to FIGS. 3 and 4, the magnetic force generation member 200 may include a pair of magnetic force generation members provided on the chassis 50 and the vehicle body 10. The magnetic force generation members 200 may be positioned to face each other, and generate a magnetic force to absorb shock when a bump of the vehicle body 10 is formed. In the present embodiment, the magnetic force generation members 200 may include an upper magnetic force generation member 210 positioned at the top of the stopper member 100 and a low magnetic force generation member 230 positioned at the bottom of the stopper member 100.

When a bump of the vehicle body 10 is formed, a distance between the upper magnetic force generation member 210 and the lower magnetic force generation member 230 decreases. In the present embodiment, the upper magnetic force generation member 210 and the lower magnetic force generation member 230 may be provided in such a manner that the same polarities face each other, and absorb shock using a repulsive force between the upper magnetic force generation member 210 and the lower magnetic force generation member 230, when a bump of the vehicle body 10 is formed. In the present embodiment, the magnetic force generation member 200 may include a magnetic force generation part 250 and a fixation member 260.

The magnetic force generation part 250 may generate a magnetic force. In the present embodiment, the magnetic force generation part 250 may include an electromagnet which converts power applied from outside into a magnetic force.

The fixation member 260 may couple the magnetic force generation part 250 to the top or bottom of the stopper member 100. The top of the stopper member 100 may correspond to a bracket or the like, to which the vehicle body 10, or particularly, the upper seat part 110 is coupled. The bottom of the stopper member 100 may correspond to a lower end part thereof, which comes in contact with the chassis 50 when a bump of the vehicle body 10 is formed. In the present embodiment, the bottom of the stopper member 100 may correspond to the stopper bracket 55. In the present embodiment, the fixation member 260 may include a holder part 270 and a fixation bracket part 280.

The holder part 270 may be formed to surround the magnetic force generation part 250, and include a non-conductor to block a current supplied to the magnetic force generation part 250 from transmitting to the stopper bracket 55 or the like. In the present embodiment, the holder part 270 may include a holder body 271 and a holder cap 275.

The holder body 271 may have a space provided therein, into which the magnetic force generation part 250 is inserted. In the present embodiment, the holder body 271 may be formed to surround the magnetic force generation part 250, and have one open side through which the magnetic force generation part 250 is inserted in a sliding manner.

The holder body 271 may have a holder hole 272 formed at the bottom thereof when the holder body 271 is positioned in a direction facing the stopper member 100, that is, at the top of the stopper member 100. Furthermore, the holder body 271 may have a holder hole 272 formed at the top thereof when the holder body 271 is positioned at the bottom of the stopper member 100.

The holder hole 272 may prevent a magnetic force generated through the magnetic force generation part 250 from being blocked by the holder body 271. Furthermore, the holder hole 272 may reduce an increase of oil pressure which is generated when the stopper member 100 is compressed, thereby preventing damage of the stopper member 100 and the magnetic force generation part 250. At this time, an entry and exist hole 300 to be described below may play the same role as the holder hole 272.

The holder cap 275 may be detachably coupled to the holder body 271, and prevent the magnetic force generation part 250 from coming off the holder body 271. In the present embodiment, the holder cap 275 may have a screw thread formed on the inner circumferential surface thereof, and the screw thread of the holder cap 275 may be coupled to a screw thread formed on the outer circumferential surface of the holder body 271.

The fixation bracket part 280 may fix the holder part 270 to the top or bottom of the stopper member 100. In the present embodiment, the fixation bracket part 280 may be formed of a metallic material, and fix the upper magnetic force generation member 210 to the vehicle body 10, or fix the lower magnetic generation unit 230 to the stopper bracket 55. In the present embodiment, the fixation bracket part 280 may have a bracket hole 282 through which fluid can flow into the fixation bracket part 280.

In the present embodiment, the stopper member 100 and the magnetic generation member 200 may have an entry and exit hole 300 formed therethrough. In the present embodiment, the entry and exit hole 300 is formed in a shape which passes through the upper magnetic force generation member 210, the lower magnetic force generation member 230, and the stopper member 100.

In the present embodiment, when the stopper member 100 is compressed, the entry and exit hole 300 may prevent an increase in oil pressure in the stopper member 100 and between the stopper member 100 and the magnetic force generation member 200, and prevent damage of the magnetic force generation part 250 or the like. In the present embodiment, the bump shock absorbing device 1 may further include a sensor unit 400, a magnetic force adjusting unit 500, and a control unit 600.

The sensor unit 400 may measure a bump value indicating to which extent a bump of the vehicle body 10 is formed. The bump value may be measured on the basis of a rotation angle of the vehicle body 10 and the height of the vehicle body 10. In the present embodiment, the sensor unit 400 may include a height sensor mounted on the suspension or the vehicle body 10. The sensor unit 400 may measure a bump value by sensing a rotation angle of a rod attached to the height sensor, and transmit the measured bump value to the control unit 600.

Since the configuration and operation principle of the height sensor are apparent to those skilled in the art, the detailed descriptions thereof are omitted herein.

The magnetic force adjusting unit 500 may adjust a magnetic force of the magnetic force generation part 250, that is, the magnitude and direction of the magnetic force. In the present embodiment, the magnetic force adjusting unit 500 may indicate a power supply unit which adjusts power supplied to the magnetic force generation part 250. In the present embodiment, the magnetic force adjusting unit 500 may adjust the magnitude and direction of a current transmitted to the magnetic force generation part 250 from a battery 500 of the vehicle, and adjust the magnetic force generated by the magnetic force generation part 250.

The control unit 600 may adjust the magnetic force generated by the magnetic generation unit 250 through the magnetic force adjusting unit 500 according to the bump value. In the present embodiment, the control unit 600 may operate the magnetic force adjusting unit 500 to generate a magnetic force, when the height of the stopper member 100, calculated on the basis of the bump value measured through the sensor unit 400, corresponds to a preset value, for example, a block height h2+10 mm. The magnetic forces generated from the upper and lower magnetic force generation members 210 and 230 may generate a repulsive force based on the same polarity, and reduce a shock when a bump is formed.

Figure 5:
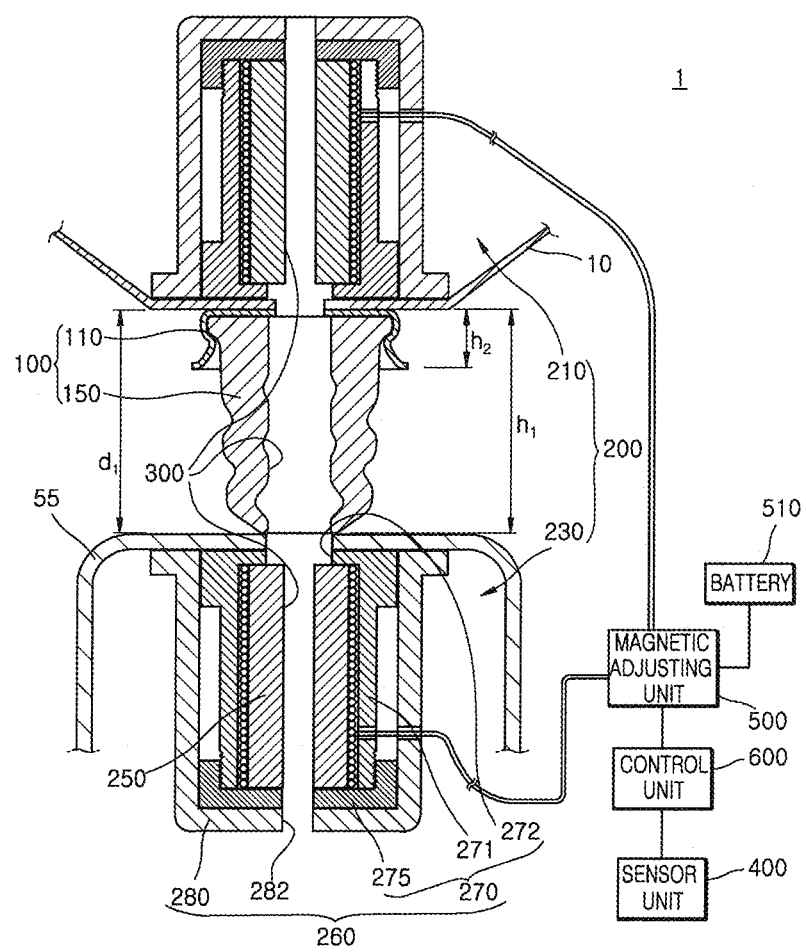
FIG. 5 is a diagram illustrating a state in which a stopper member of the bump shock absorbing device in accordance with the embodiment of the present invention is contacted with a stopper bracket.
Figure 6:
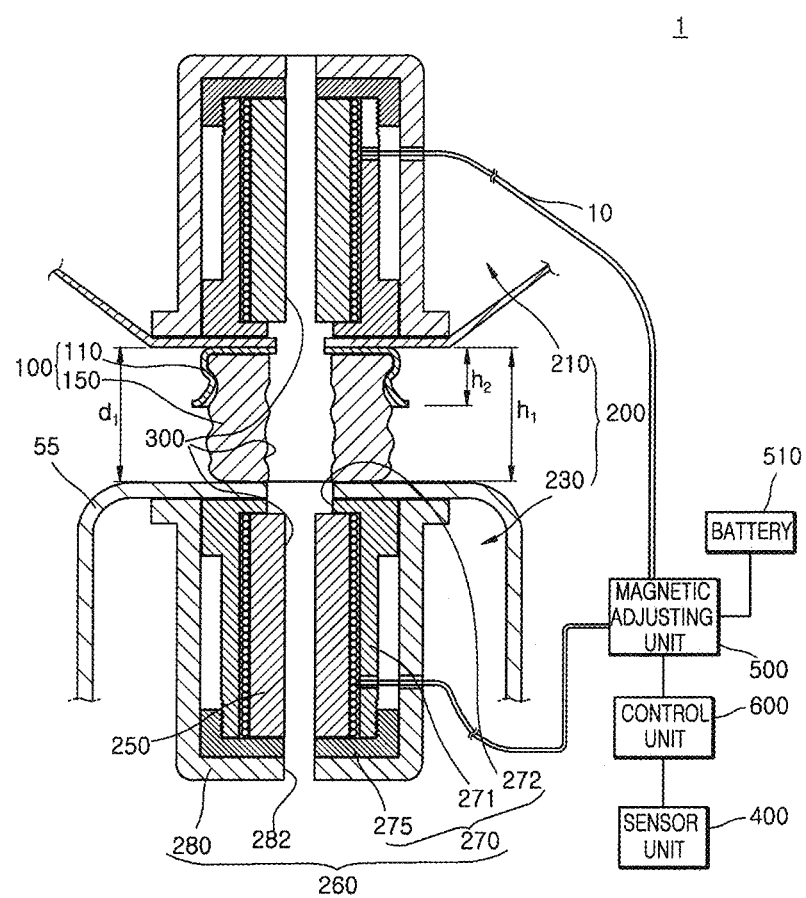
FIG. 6 is a diagram illustrating a state in which the stopper member of the bump shock absorbing device in accordance with the embodiment of the present invention is compressed.

FIG. 5 is a diagram illustrating a state in which the stopper member of the bump shock absorbing device in accordance with the embodiment of the present invention is contacted with the stopper bracket. FIG. 6 is a diagram illustrating a state in which the stopper member of the bump shock absorbing device in accordance with the embodiment of the present invention is compressed.

Referring to FIGS. 4 to 6, the operation principle of the bump shock absorbing device 1 in accordance with the embodiment of the present invention will be described as follows.

When a bump of the vehicle body 10 is formed, a distance d1 between the vehicle body 10 and the stopper bracket 55 may be decreased. When the distance d1 between the vehicle body 10 and the stopper bracket 55 becomes equal to the height h1 of the stopper member 100, the stopper member 100 starts to be contacted and compressed against the stopper bracket 55.

The sensor unit 400 may measure a bump value of the body vehicle 10 in real time, and transmit the measured bump value to the control unit 600. When the measured bump value of the vehicle body 10 corresponds to a preset value, for example, a bump value in case where the height h1 of the compressed stopper member 100 is equal to or less than h2+10 mm, the control unit 600 may operate the magnetic force adjusting unit 500 such that the upper magnetic force generation member 210 and the lower magnetic force generation member 230 generate magnetic forces.

The magnetic adjusting unit 500 may apply a current to the upper magnetic force generation member 210 and the lower magnetic force generation member 230 such that the same polarities of the magnetic forces generated from the upper and lower magnetic force generation members 210 and 230 face each other. Then, a repulsive force may be generated between the upper magnetic force generation member 210 and the lower magnetic force generation member 230.

The repulsive force generated between the upper magnetic force generation member 210 and the lower magnetic force generation member 230 may offset or reduce a shock force which compresses the stopper member 100.

The bump shock absorbing device 1 in accordance with the embodiment of the present invention may absorb shock which occurs when a bump of the vehicle body 10 is formed, thereby preventing damage of the chassis 50 and the vehicle body 10 and occurrence of noise and improving a ride quality.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A vehicle comprising:
   a vehicle body comprising a first electromagnet device and a first surface;
   a chassis comprising a second electromagnet device and a second surface opposing the first surface;
   a compressible damper arranged between the first and second electromagnet devices such that, while driving the vehicle, the first surface of the vehicle body and the second surface of the chassis move toward each other without compressing the compressible damper, and then the first and second surfaces further move toward each other to compress the compressible damper; and
   at least one controller configured to selectively apply electric power between the first and second electromagnet devices based on a distance between the first and second surfaces, wherein the at least one controller is configured such that the electric power is applied to move the first and second electromagnet devices away from each other when the compressible damper is being compressed and also when the distance between the first and second surfaces reaches a predetermined value.

2. The vehicle of claim 1, wherein the first and second electromagnet devices and the compressible damper are aligned along a direction.

3. The vehicle of claim 2, further comprising a seat cup coupled to the vehicle body and disposed between the first and second electromagnet devices, the seat cup configured to receive the compressible damper, wherein the seat cup has a height measured in the direction smaller than the predetermined value.

4. The vehicle of claim 2, wherein the compressible damper has a non-compressed height, which allows the first and second surfaces to move toward each other without compressing the compressible damper without compressing the compressible damper before the compressible damper is compressed.

5. The vehicle of claim 2, wherein the compressible damper is attached to the vehicle body and has a non-compressed height which allows the first and second surfaces to move toward each other without touching the second surface by the compressible damper before the compressible damper is compressed.

6. The vehicle of claim 1, wherein each of the first and second electromagnet device and the compressible damper comprises of a through-hole aligned along a direction which allows fluid to pass therethrough.

7. The vehicle claim 1, further comprising at least one sensor connected to the at least one controller, the at least one sensor configured to detect a rotation angle and a height of the vehicle body.

8. The vehicle of claim 7, wherein the at least one controller is configured to compute the distance between the first and second surfaces based on the rotation angle and the height of the vehicle body for selectively applying the electric power between the first and second electromagnet devices using the distance computed.

9. The vehicle of claim 1, wherein the at least one controller is configured to apply the electric power between the first and second electromagnet devices using the distance.

* * * * *